Oct. 26, 1954 T. S. GATES 2,692,536
AUTOMATIC LOADING EQUIPMENT FOR MACHINE TOOLS
Filed July 2, 1953 11 Sheets-Sheet 1

INVENTOR.
THOMAS S. GATES
BY Whittemore, Hulbert
& Belknap ATTORNEYS

Oct. 26, 1954   T. S. GATES   2,692,536
AUTOMATIC LOADING EQUIPMENT FOR MACHINE TOOLS
Filed July 2, 1953   11 Sheets-Sheet 2
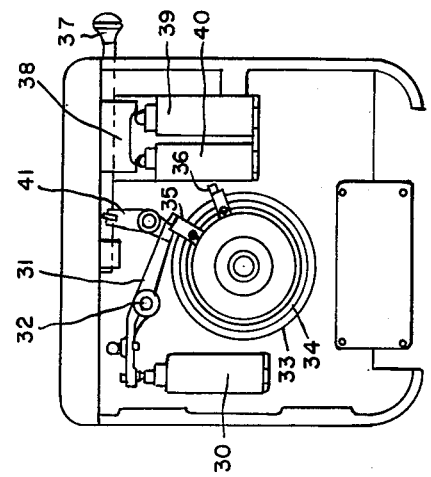
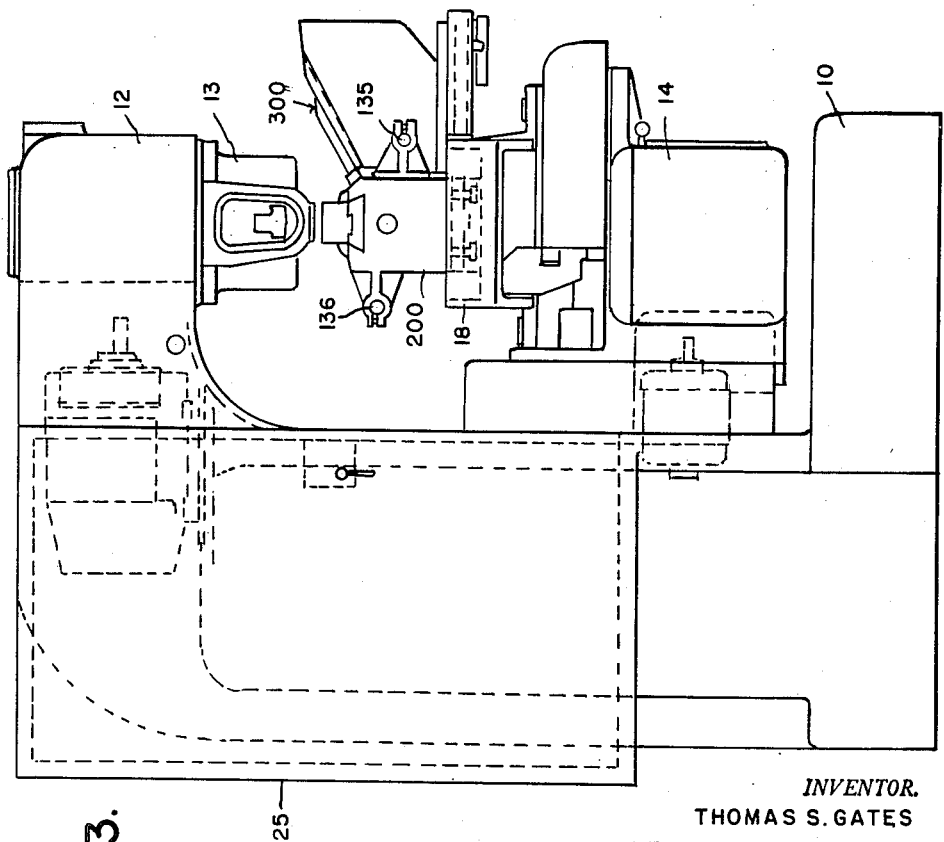
*INVENTOR.*
THOMAS S. GATES
BY
Whittemore, Hulbert
& Belknap   ATTORNEYS

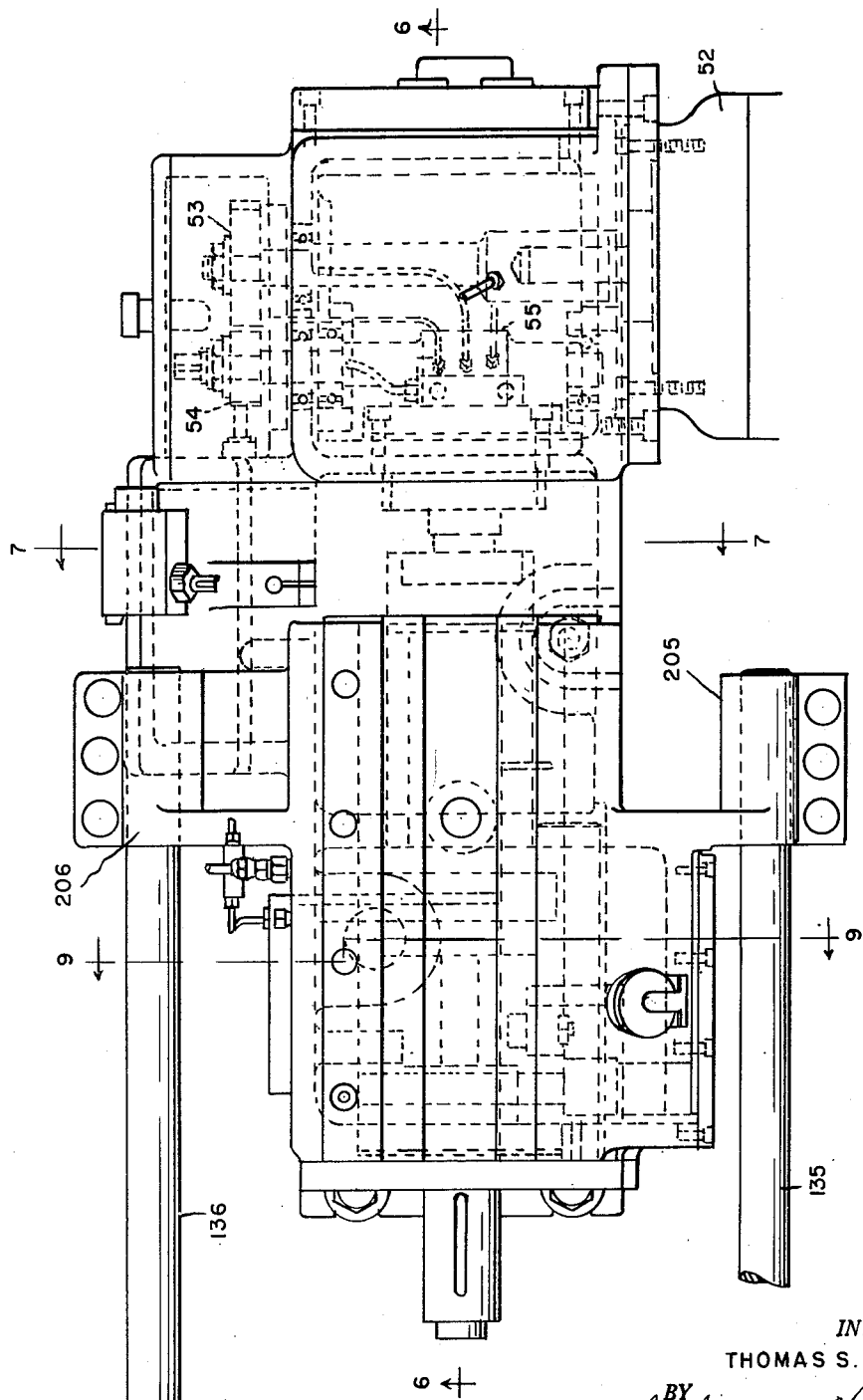

INVENTOR.
THOMAS S. GATES

ATTORNEYS

Oct. 26, 1954     T. S. GATES     2,692,536
AUTOMATIC LOADING EQUIPMENT FOR MACHINE TOOLS
Filed July 2, 1953     11 Sheets-Sheet 5
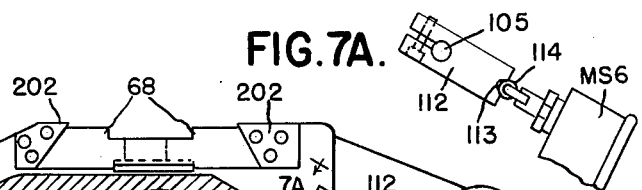
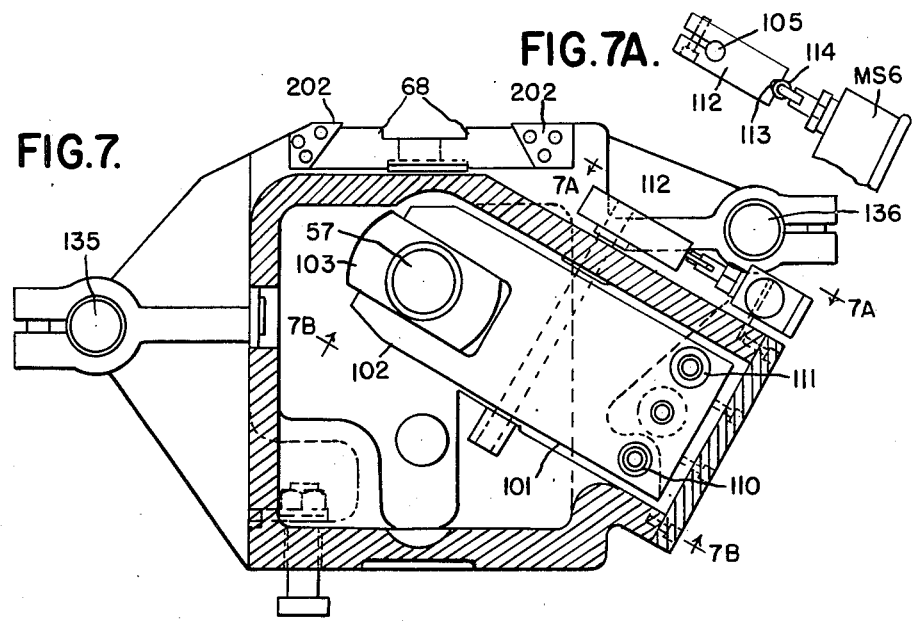
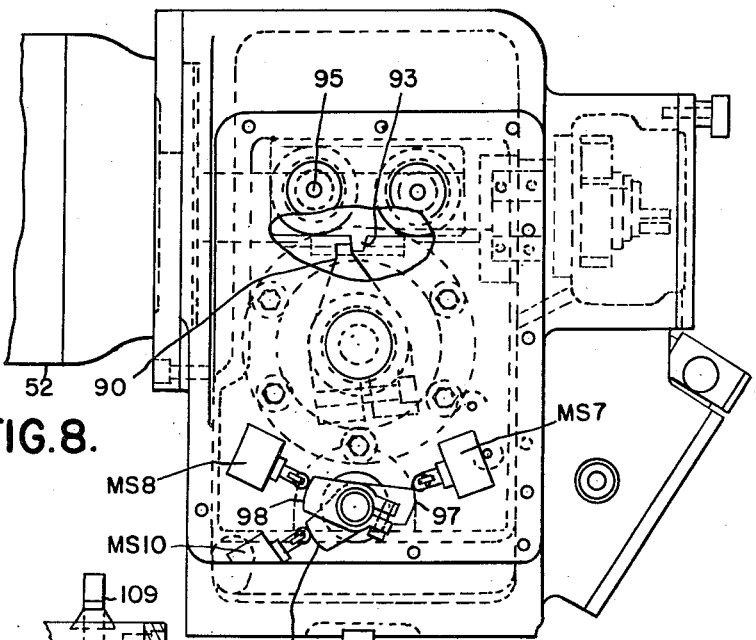
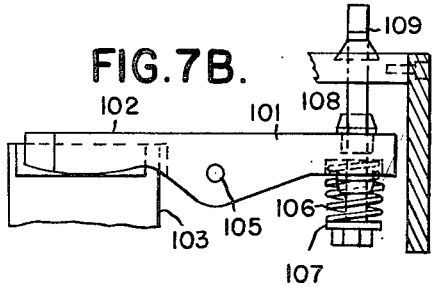
*INVENTOR.*
THOMAS S. GATES
BY Whittemore,
Hulbert & Belknap
ATTORNEYS INVENTOR.
THOMAS S. GATES
BY Whittemore, Hulbert
& Belknap
ATTORNEYS Oct. 26, 1954     T. S. GATES     2,692,536
AUTOMATIC LOADING EQUIPMENT FOR MACHINE TOOLS
Filed July 2, 1953     11 Sheets-Sheet 7

*INVENTOR.*
THOMAS S. GATES
BY Whittemore, Hulbert
& Belknap
ATTORNEYS

Oct. 26, 1954 T. S. GATES 2,692,536
AUTOMATIC LOADING EQUIPMENT FOR MACHINE TOOLS
Filed July 2, 1953 11 Sheets-Sheet 8
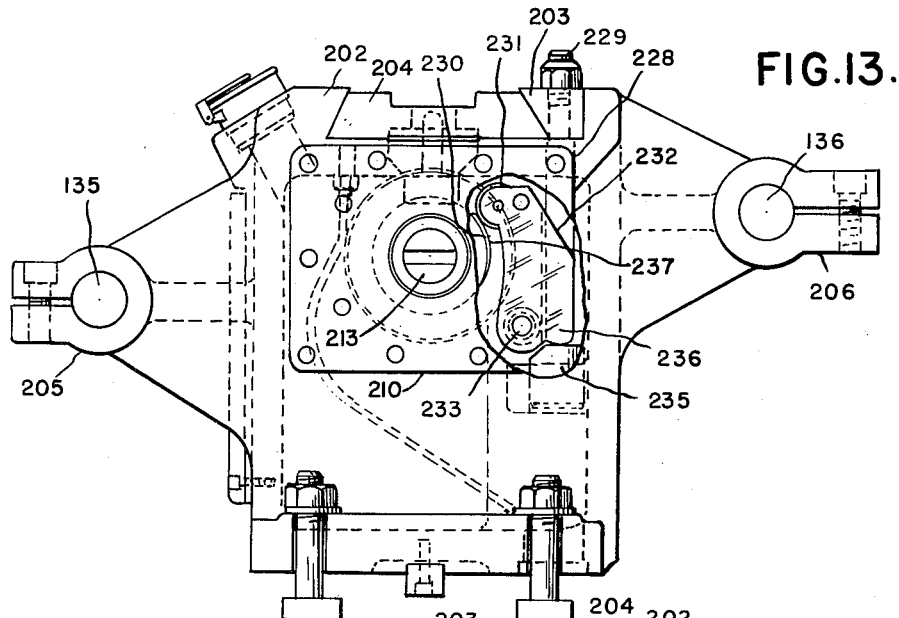
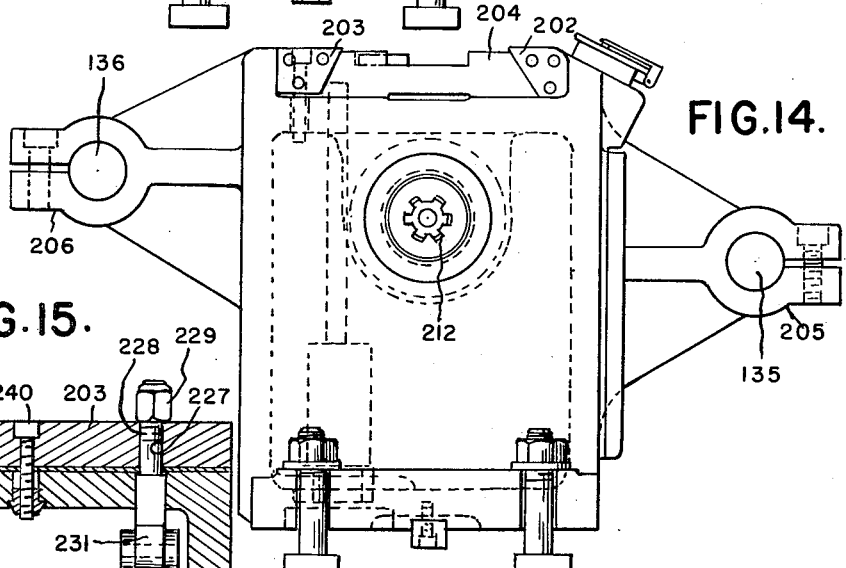
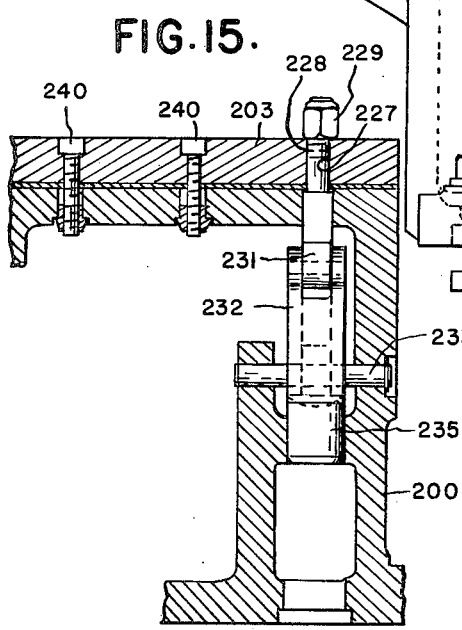
*INVENTOR.*
THOMAS S. GATES
BY
Whittemore, Hulbert
& Belknap
ATTORNEYS Oct. 26, 1954 T. S. GATES 2,692,536
AUTOMATIC LOADING EQUIPMENT FOR MACHINE TOOLS
Filed July 2, 1953 11 Sheets-Sheet 9
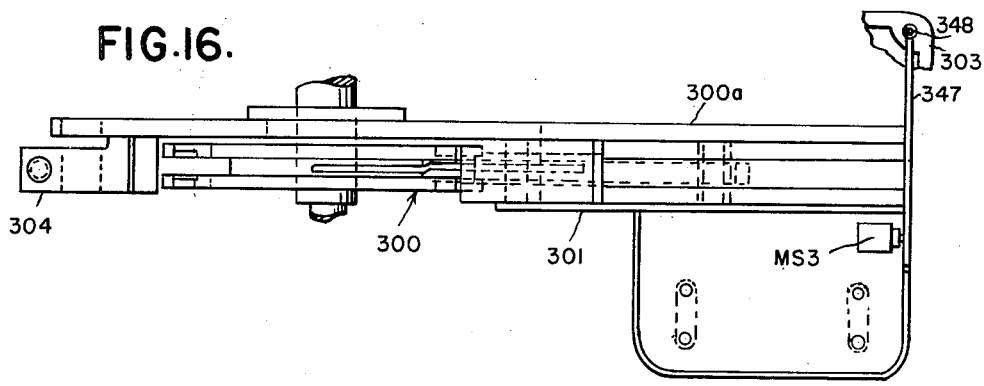
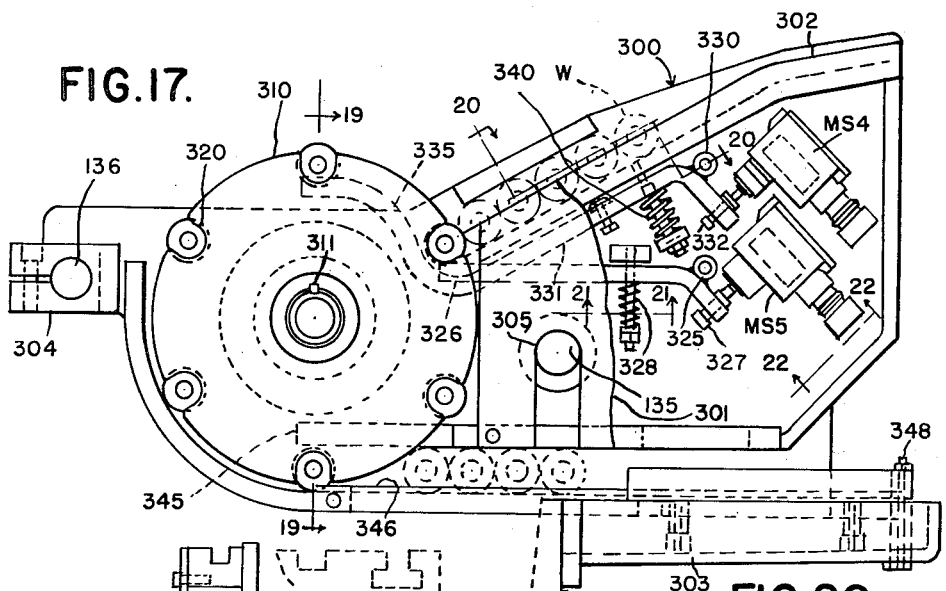
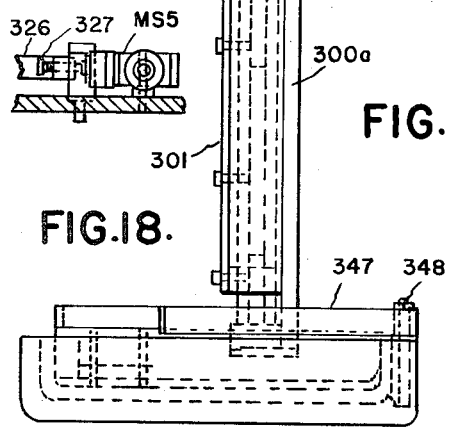
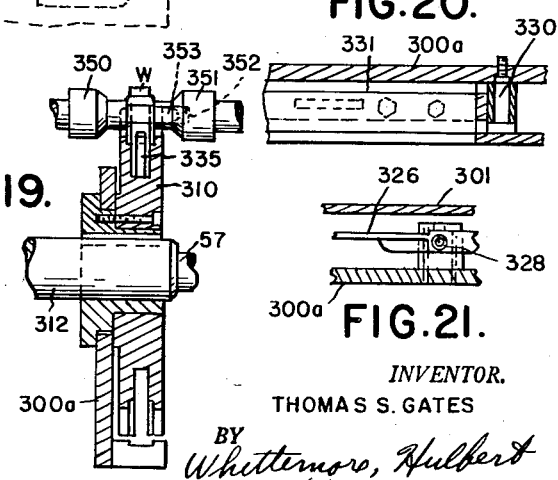
INVENTOR.
THOMAS S. GATES
BY Whittemore, Hulbert & Belknap
ATTORNEYS Oct. 26, 1954            T. S. GATES            2,692,536
AUTOMATIC LOADING EQUIPMENT FOR MACHINE TOOLS
Filed July 2, 1953            11 Sheets-Sheet 10
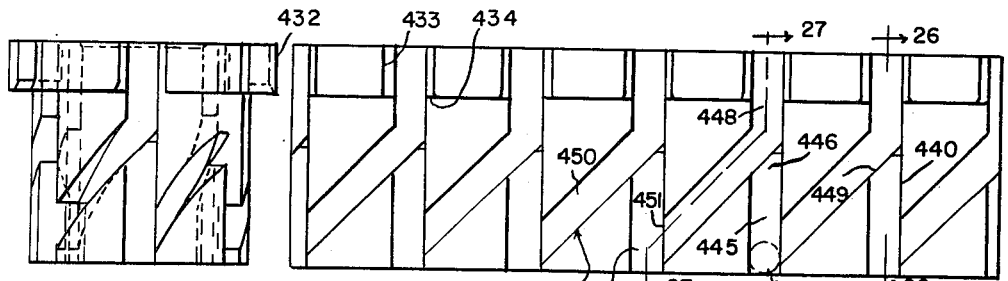
FIG.23.
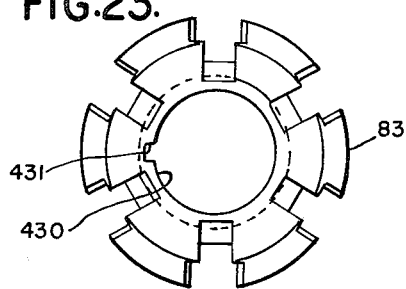
FIG.24.
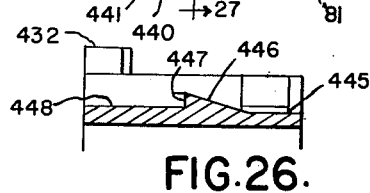
FIG.26.
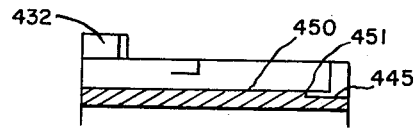
FIG.27.
FIG.25.
FIG.29.            FIG.28.
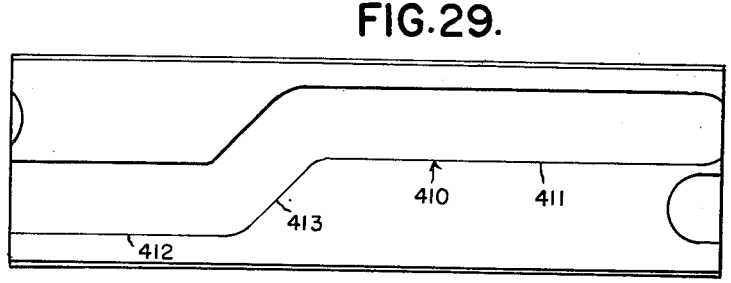
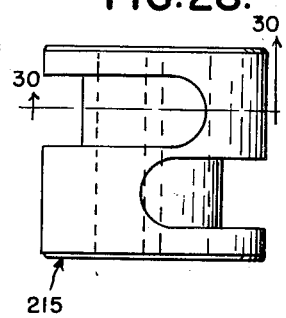
FIG.30.
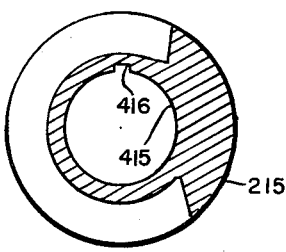
INVENTOR.
THOMAS S. GATES
BY
Whittemore, Hulbert
& Belknap
ATTORNEYS Oct. 26, 1954 T. S. GATES 2,692,536
AUTOMATIC LOADING EQUIPMENT FOR MACHINE TOOLS
Filed July 2, 1953 11 Sheets-Sheet 11

INVENTOR.
THOMAS S. GATES
BY
Whittemore, Hulbert
& Belknap
ATTORNEYS

Patented Oct. 26, 1954

2,692,536

UNITED STATES PATENT OFFICE 2,692,536

AUTOMATIC LOADING EQUIPMENT FOR MACHINE TOOLS

Thomas S. Gates, Grosse Pointe Woods, Mich., assignor to National Broach & Machine Company, Detroit, Mich., a corporation of Michigan Application July 2, 1953, Serial No. 365,655

25 Claims. (Cl. 90—1.6)

The present invention relates to automatic loading equipment for a machine tool. Reference is made to applicant's copending application Serial No. 223,788, entitled "Method for Automatic Loading of Machine Tools," filed April 30, 1951, now abandoned.

The present application is a continuation-in-part of my prior copending application Serial No. 783,715, filed November 3, 1947, now abandoned.

It is an object of the present invention to provide means whereby a plurality of articles to be machined may be placed in a loading fixture and thereafter automatically advanced to working position in the machine, gripped in working position, machined, released, and thereafter further advanced and discharged from the machine.

More specifically, it is an object of the present invention to provide an automatic loading mechanism for a machine tool effective to operate in a fully automatic manner upon a plurality of work pieces and to continue operation on the work piece so long as a supply of work pieces is available.

It is a further object of the present invention to provide automatic loading mechanism for a machine tool comprising means for receiving a plurality of work pieces, means for advancing the work pieces to working position in sequence, means for gripping the work pieces at working position, means for machining the work pieces, means for releasing the work pieces after machining, and means for discharging finished work pieces from the machine.

It is a further object of the present invention to provide automatic handling apparatus for a plurality of work pieces to be operated upon sequentially by a machine tool including means for interrupting automatic operation of the machine when the supply of work pieces is exhausted, when a work piece of other than predetermined size is presented, or when the means for receiving finished work pieces from the machine is filled.

It is a feature of the present invention to provide a machine for advancing a plurality of gears automatically in sequence to mesh with a gear-like tool including means responsive to failure of the gear and tool to mesh properly to interrupt operation of the machine.

It is a further feature of the present invention to provide a machine tool adapted to operate automatically upon a sequence of gear-like work pieces with a gear-like tool which comprises means for advancing a work piece into position to mesh with the gear-like tool, and means responsive to failure of the gear-like parts to mesh to impart a slight rotational movement to one of the parts to cause the parts to mesh.

It is a further feature of the present invention to provide a gear finishing machine including a gear-like cutter, a work support for supporting a gear-like work piece in mesh with the cutter, means for advancing a work gear toward the cutter along a path generally tangential to the cutter, and means for effecting slow rotation of the cutter prior to full meshing therewith of the gear.

It is a further feature of the present invention to provide in a fully automatic machine tool, cycling means including a rotary part adapted to have predetermined rotation first in one direction and then in the other, in combination with a mechanical stop associated with the part and friction clutch means intermediate the part and a driving motor.

It is a further feature of the present invention to provide in a machine tool indexing mechanism including reversely rotatable drive means therefor, cam means effective to change the reverse rotation of one part to a back-and-forth translation of a second part and additional cam means effective to convert the back-and-forth translation of the second part to intermittent, uni-directional, incremental, rotational movement of an indexed member.

It is a further feature of the present invention, in a machine tool of the type described, to provide work gripping means effective to apply a predetermined pressure to a work piece.

It is a further feature of the present invention, in a machine tool of the character described, to provide an index drum having recesses in its periphery to receive a plurality of work pieces and to advance the work pieces from loading to working position, in combination with work gripping arbors at the working position to engage the work pieces and to drive the work pieces in rotation.

Other objects and features of the invention will become apparent as the description proceeds, especially when taken in conjunction with the accompanying drawings, wherein:

Figure 3 is a side elevation of the machine looking from the left of Figure 1.

Figure 4 is a fragmentary enlarged side elevation of the machine looking at the knee from the left in Figure 1, with the cover removed and showing the table reversing and controlling mechanism.

Figure 5 is a plan view of the right hand head of the automatic loading attachment.

Figure 7 is a section on the line 7—7 of Figure 5.

Figure 7A is a fragmentary end view of a safety cam and switch taken along the line 7A—7A of Figure 7.

Figure 7B is a fragmentary section taken along the line 7B—7B of Figure 7.

Figure 8 is a side elevation looking from the right of the left hand head shown in Figure 5.

Figure 13 is a side elevation of the left hand head looking to the right of Figure 11.

Figure 14 is a side elevation of the left hand head looking to the left fo Figure 11.

Figure 15 is a section on the line 15—15 of Figure 11.

Figure 16 is a plan view of the loading fixture assembly of the automatic loading attachment.

Figure 17 is a side elevation of the loading fixture assembly looking from the left side of the machine.

Figure 18 is a front elevation of the loading fixture assembly.

Figure 19 is a vertical section on the line 19—19 of Figure 17 through the drum of the loading fixture assembly, showing the work supporting elements in position to engage a gear.

Figure 20 is an enlarged fragmentary section on the line 20—20 of Figure 17.

Figure 21 is an enlarged fragmentary section on the line 21—21 of Figure 17.

Figure 22 is a fragmentary section on the line 22—22 of Figure 17.

Figure 23 is a side elevation of the indexing cam for the right hand head.

Figure 24 is an end view of the indexing cam for the right hand head.

Figure 25 is a developed view of the cam shown in Figures 23 and 24.

Figure 26 is a section on the line 26—26 of Figure 25.

Figure 27 is a section on the line 27—27 of Figure 25.

Figure 28 is a side view of the tailstock advance cam.

Figure 29 is a developed view of the cam shown in Figure 28.

Figure 30 is a section on the line 30—30 of Figure 28.

Figure 2:
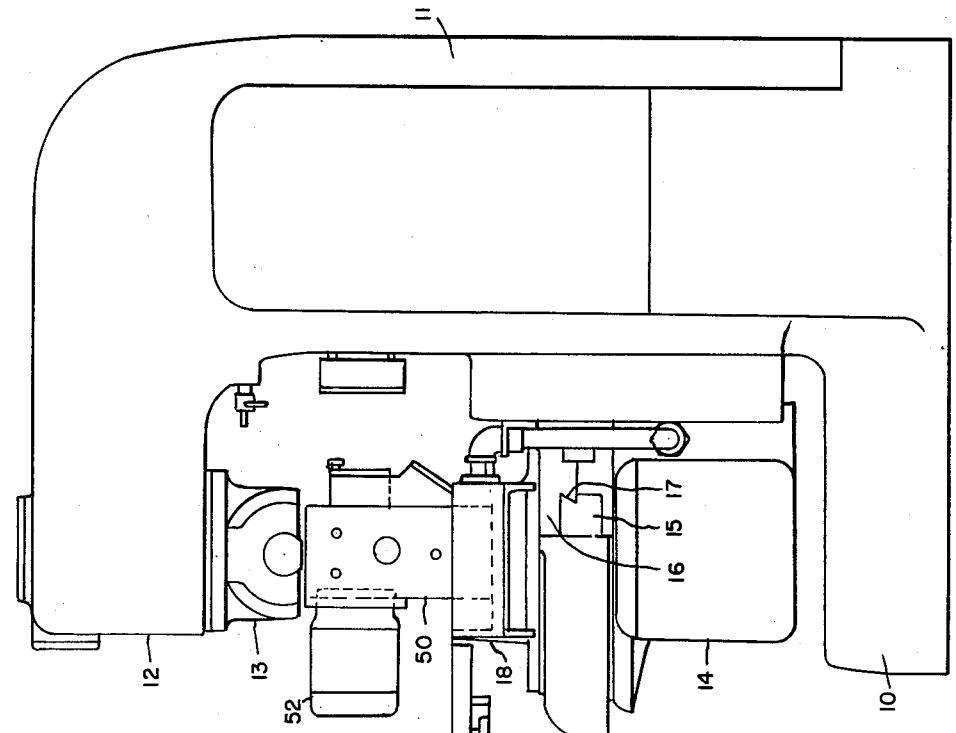
Figure 2 is a side elevation of the machine looking from the right of Figure 1.

In order to simplify the description of the rather complicated mechanism illustrated herein, it is proposed to divide the description into sections. Accordingly, the machine assembly and organization as a whole will be first described.

General assembly and organization

Referring first to Figures 1–4, the invention is illustrated in conjunction with a gear shaving machine. While the gear shaving machine has been selected for purposes of illustrating the invention, it will be readily apparent that the utility of the present invention is by no means limited to use with a gear shaving machine, but instead it may be incorporated in substantially any type of machine tool which is adapted to work on a rotary work piece.

The machine illustrated in Figures 1–4 is known as a crossed axes gear shaving machine. It comprises a main frame 10 having a pedestal 11 projecting upwardly therefrom terminating in a forwardly projecting overhanging portion 12 to which is secured an angularly adjustable tool support 13. Located on the front of the column is a vertically adjustable work supporting means comprising a knee 14, a pair of angularly adjustable plates 15 and 16 having cooperating rectilinear ways 17 extending therebetween and a table 18 which is secured to the upper plate 16 for adjustment about a vertical axis and which moves with the upper plate 16 as the upper plate is reciprocated in the ways 17. The machine as so far described is a standard gear finishing machine and in order to complete the machine a conventional headstock and tailstock were mounted on the upper surface of the table 18 adapted to support a gear therebetween. The gear was mounted in position to mesh with a gear-like cutter carried by the adjustable tool support 13 and the gear and tool were rotated in mesh with their axes crossed at a limited angle while at the same time a relative traverse was provided in a desired direction in a horizontal plane specifically by effecting traverse of the upper plate 16 relative to the lower plate 15.

This machine was manually operated in that the operator loaded a single gear on the machine, after which the gear automatically went through a predetermined cycle. It was then necessary for the operator to remove the finished gear and replace it with the gear to be finished. According to the present invention, mechanism is provided by means of which a plurality of gears may be placed in position to be fed automatically, preferably by gravity, to the work supporting means and the entire repeated cycle of the machine will be fully automatic. Gears are automatically brought into position for engagement by the work supporting means. Work supporting means is then brought into engagement with the gear. Upon completion of the engagement of the gear by the gear supporting means rotation of the gear and tool is initiated while at the same time the relative traverse between the gear and tool is effected preferably to accomplish two strokes, after which rotation of the gear and tool is stopped. At this time the work supporting means automatically disengages the gear and a new gear is automatically brought into position to be engaged by the work supporting means. So long as a supply of gears is provided in the machine the machine continues to operate in a fully automatic manner and will shave a large number of gears without requiring the attention of the operator.

The automatic loading attachment is carried by the table 18 which is reciprocable relative to the cutter, and means are provided effective to release the gear from the automatic loading attachment for rotation on the head and tailstocks. Since the automatic loading attachment is mounted on and movable with the table, it is necessary only to provide for small separation between the work gear and the gear supporting portion of the automatic loading equipment. Means are also provided to insure meshing between a work gear and the gear-like cutter or tool and this means comprises means for effecting slow rotation of the cutter prior to meshed engagement between the cutter and a work gear. In some cases the automatic loading attachment may be provided with means responsive to failure of the cutter and gear to mesh to initiate rotation of the cutter. In other cases, means may be provided which are operated during each loading cycle to insure rotation of the cutter whether the gear meshes therewith on initial contact or not.

Figure 1:
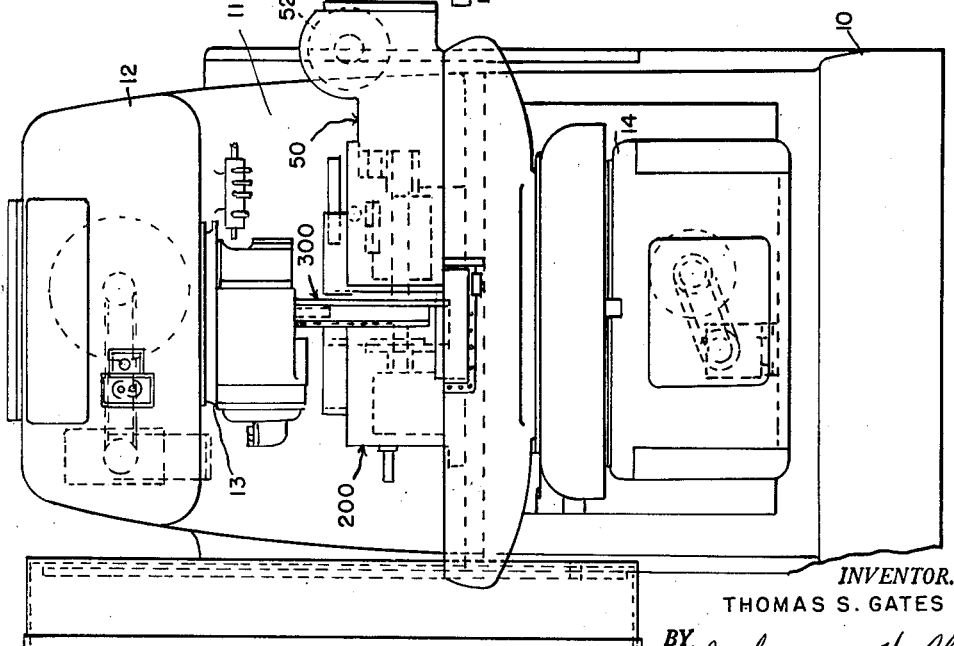
Figure 1 is a front elevation of the machine.

The automatic loading attachment which forms the subject matter of the present invention comprises essentially a right hand head 50 shown in Figures 1 and 2, a left hand head 200 shown in Figures 1 and 3, and a loading fixture 300 shown in Figures 1 and 3.

The machine comprises considerable electrical equipment and for convenience this equipment is provided on a panel board located in a rectangular housing 25 mounted at one side of the machine.

Located within the knee 14 is a table safety stop switch 30 adapted to be actuated by a lever 31 pivoted as indicated at 32. Lever 31 is actuated by the dogs 35 and 36 in the event that switches 39 and 40 fail to operate. The mechanism for effecting traverse and reversing of the table includes a timing disc 33 having a circular T-slot 34 or the like formed therein in which are adjustably mounted a pair of lever actuating dogs 35 and 36. The dogs 35 and 36 may be set to predetermine the length of stroke of traverse of the table and to effect an over-and-back stroke followed by interruption of traverse. A manual push button rod 37 is provided having a cam 38 adapted to actuate one or the other of a pair of switches 39 and 40, and is effective to obtain hand cycling of the machine as well as to control traverse in a step-by-step manner if desired. Under automatic operation however, when the machine is started the dogs 35 and 36 actuate the lever 41 which is connected to the push button rod 37 and the cam 38 which actuates the switches 39 and 40 and is effective to provide rotation of the gear and tool accompanied by traverse throughout a first traverse stroke. At the end of the traverse stroke direction of rotation of the gear and tool is reversed and the direction of traverse is reversed to initiate a second traverse stroke. At the end of the second stroke traverse is stopped and rotation of the gear and tool is terminated, thus completing a cycle.

*Right hand head assembly*

Figure 6:
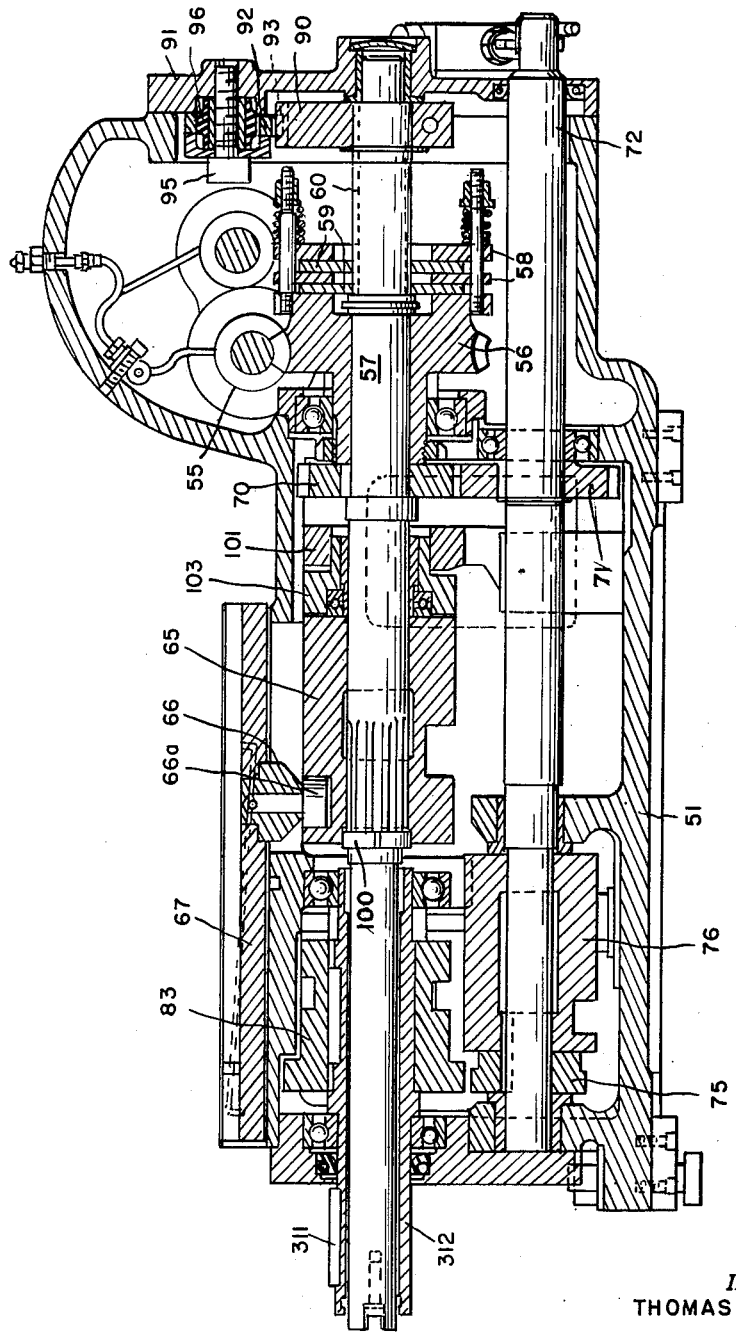
Figure 6 is a section on the line 6—6 of Figure 5.
Figure 9:
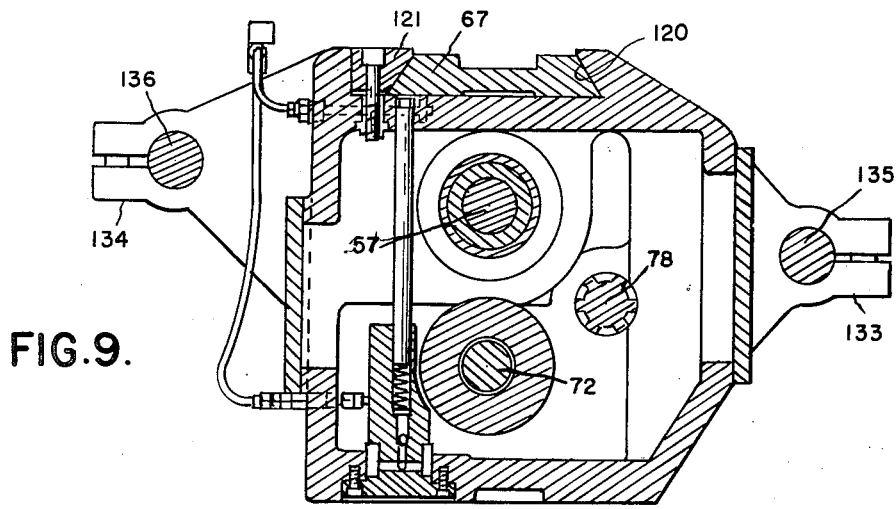
Figure 9 is a section on the line 9—9 of Figure 5.

The right hand head assembly, indicated generally at 50 in Figure 1, is illustrated in detail in Figures 5 through 10. As best seen in Figure 6, the right hand head assembly comprises a main casting 51 bolted or otherwise secured to the table 18 of the machine. Extending forwardly from the casting 51 is a motor 52 which is the single source of power for actuating all of the various elements of the automatic loading attachment. The motor 52 is connected through change gears 53, 54 with a worm 55 meshing with a worm gear 56 rotatably mounted on shaft 57. The worm gear 56 has secured thereto annular friction members 58 which are adapted to cooperate with friction elements 59 non-rotatively held with respect to the shaft 57, as, for example, by inwardly projecting portions which extend into the keyways 60. Thus rotation of the motor in either direction is effective to rotate the shaft 57, the driving however, including the friction elements 58 and 59 which permit slippage. In the operation of the machine, accurate predetermined rotation of the shaft 57 first in one direction and then in the other is required and suitable stop means later to be described are provided. It is accordingly contemplated that each actuation of the motor 52 will result in a predetermined amount of rotation of the shaft 57 after which further rotation of the shaft is mechanically prevented and slippage between the friction members 58 and 59 takes place.

Keyed to the shaft 57 is the headstock advance cam 65 which will be described further in detail. For the present it is sufficient to note that the cam 65 is movable axially a limited amount on the shaft 57 and includes a cam groove receiving a roller 66a of a cam follower 66 rigidly mounted on a headstock support plate 67 slidable on ways 68 best seen in Figure 7.

Keyed or otherwise secured to the shaft 57 is a gear 70 adapted to mesh with a similar gear 71 keyed or otherwise secured to a countershaft 72. The shaft 72 adjacent its inner end has a pair of cams secured thereto, one of these being a gib clamping cam 75 and the other being an index actuator cam 76 shown in Figures 35 to 37 and later to be described in detail. An index slide 77 is mounted on a spline shaft 78 for sliding movement and has an arm 79 carrying a roller 80 which engages in the slot of the cam 76. Rotation of the cam 76 results in back-and-forth sliding movement of the index slide 77. The slide 77 is provided with a pin 81 which is received within the drive slots 82 of the index cam 83. Details of the cams and their exact operation will be described in a later section, but for the present it is sufficient to note that slots 82 of the index cam 83 are so arranged that upon sliding motion of the index slide 77 in one direction, the index cam 83 will be rotated by a predetermined amount and in the present instance through an angle of 60 degrees. Reverse sliding movement of the index actuator cam 76 has no effect on the index cam 83 except to locate the actuator pin 81 in a position such that upon the next forward sliding movement of the index slide 77, a further 60 degrees rotation of the index cam will result.

Reference was previously made to the fact that mechanical means are provided for predetermining the amount of rotation of the shaft 57. The mechanism for accomplishing this result is illustrated in Figures 6 and 8. Clamped or otherwise rigidly secured to the shaft 57 is a stop arm 90. The right hand head casting 51 is provided with a removable end plate 91, to the inside of which is resiliently secured a stop plate 92 having a depending finger 93 in position to be engaged by the end of the stop arm 90. As best seen in Figure 8, the stop arm 90 is thus permitted substantially 360 degrees of rotation before its rotation is stopped by engagement between the stop arm 90 and the finger 93. The stop plate 92 is supported by a pair of bolts 95 threaded into suitably tapped openings in the end closure plate 91 and rubber cushioning washers 96 are provided to cushion the shock as the stop arm 90 engages the finger 93.

In order to control the motor 52 which drives the shaft 57 and the countershaft 72, a pair of micro-switches MS7 and MS8 are provided adjacent the countershaft 72. A pair of actuating cams 97 and 98 are secured on the reduced end of the countershaft 72 in position to engage the rollers of the micro-switches. The arrangement is such that when the motor 52 is energized in one direction it will cause a substantially complete rotation of the shaft 72, rotation being arrested by engagement between the stop arm 90 and one side of the stop finger 93. Just prior to or at the same time as the mechanical stoppage of the shaft by the engagement referred to, the appropriate one of the microswitches MS7 or MS8 is actuated to de-energize the motor, which however, continues rotation until the stop arm 90 has engaged the stop finger 93 and some additional rotation of the motor is permitted by virtue of the friction plates 58 and 59 previously described.

As best seen in Figure 8, the countershaft may include a third actuating cam 99 in position to engage the roller of a switch MS10, the switch being suitably connected to provide a brief momentary energization of the motor for driving the cutter in rotation. It will be understood that in the normal shaving operation, the cutter is rotated at high speeds and drives the gear at high speed due to the meshed relation between the two. It would of course be impossible to bring the gear into engagement with a cutter rotating at cutting speed without breaking or damaging the teeth of the gear or cutter. However, meshing engagement between the gear and cutter is facilitated if the cutter is rotating slowly as for example, a few revolutions per minute, when engaged by the work gear. Cam 99 is located to energize the cutter motor briefly during the loading cycle prior to engagement between a gear to be loaded and the cutter.

It is desired to provide a constant clamping pressure on the work piece by the tool engaging members and for this purpose the headstock advance cam 65 is mounted on the shaft 57 for slight relative axial movement with respect thereto. Movement of the cam 65 to the left as seen in Figure 6, is limited by a split ring 100 and a spring biased lever 101 is provided which urges the cam 65 to the left as seen in Figure 6, or in a work clamping direction. The lever 101 is best illustrated in Figure 7 and is bifurcated as indicated at 102, thus providing a pair of arms which engage a shoulder on a thrust bearing 103 adapted to transmit a force tending to move the cam 65 to the left as seen in Figure 6. The lever 101 is pivoted intermediate to its ends on a shaft 105 and at the opposite side of the shaft from the bifurcated portion 102 there is provided a compression spring 106 best seen in Figure 7B. The compression spring 106 engages the lever 101 at one end and at the other end engages an adjustable spring seat 107 (Figure 7B) which is carried by a threaded adjustment shaft 108 which terminates outside the housing in a squared end 109 to permit adjustment of the spring tension.

In clamping position, cam 65 is spaced from ring 100 and is urged to the left by the lever 101, thus predetermining pressure on the work piece.

Adjustable stop screws 110 and 111 are also provided to limit the movement of the lever 101 in both directions of movement about the axis of the shaft 105.

In order to provide a control sensitive to proper positioning of the work engaging element carried by the right hand head, the shaft 105 is provided with a cam 112 best seen in Figure 7A. The cam 112 has a notch 113 at one end into which a roller 114 of micro-switch MS6 drops when the cam 112 and hence the shaft 105 is in exactly predetermined position. Thus, if the work engaging element fails to move into full engagement with the work gear or if the gear is too wide, there will be insufficient rotation of the shaft 105 and the roller 114 will fail to reach the notch 113. On the other hand, if there is no work gear to be engaged by the work engaging element, or if the work gear is too narrow, the work engaging element will move too far to the left as seen in Figure 6, with the result that there will be too much rotation of the shaft 105 and hence of the cam 112 and the roller 114 will cross to the opposite side of the notch 113, thereby preventing further automatic actuation of the machine in its cycle.

The headstock support plate 67 which supports the work engaging element is mounted in dovetail ways comprising a solid way 120 and a movable gib 121. Means are provided which are automatically operated by the machine during its cycle for moving the gib 121 in a direction to relieve its clamping force against the plate 67 while the plate 67 is being moved toward or away from the work piece by rotation of the headstock advance cam 65. Identical means for this purpose are provided on both the right hand and left hand head and the mechanism will be described in full detail in connection with the description of the left hand head. At the present time it is sufficient to note that this mechanism includes the gib clamping cam 75 previously referred to which operates in conjunction with a lever having a portion adapted to engage the head 122 of the draw bar 123.

Means are provided for tying the right hand head, the left hand head and the automatic loading fixture together in a rigid assembly. For this purpose the frame 51 of the right hand head is provided with a pair of oppositely projecting clamping arms 133 and 134 adapted respectively to be clamped to tie rods 135 and 136.

Left hand head assembly

For the most part the left hand head assembly includes only structure which is duplicated in the right hand head assembly. The operating mechanism in the left hand head assembly includes a gib clamping device and a cam for actuating a slide which carries a work engaging element.

This structure is illustrated in Figures 11 to 15 inclusive.

The left hand head comprises a main casting 200 adapted to be bolted or otherwise secured to the table of the machine, clamping bolts being indicated at 201. At the top of the casting 200 are provided dovetail ways comprising a solid way 202 and a movable gib 203 between which is slidably mounted the support plate 204 which carries the left hand work engaging element. The frame 200 is provided with two oppositely disposed clamping ears 205 and 206 which are adapted to engage the tie rods 135 and 136 respectively.

Journaled in suitable bearings in the frame 200 and a retainer cap 210 is a hollow shaft 211 having a splined connection with a spline shaft 212, the inner end of which as indicated at 213 is formed to provide a coupling which engages the correspondingly shaped end of the shaft 57, mounted in the right hand head. Thus, rotation of the shaft 57 results in a like rotation of the spline shaft 212 and this relationship is maintained although the left hand head may be adjusted toward or away from the right hand head as desired.

Keyed or otherwise rigidly secured to the hollow shaft 211 is a tailstock advance cam 215 having a camming groove therein which receives a roller 216 depending from the plate 204. The precise shape and operation of the cam 215 will be described in a later section and for the present it is sufficient to note that as the cam 215 is rotated in one direction or the other, the tailstock support plate 204 will be moved toward or away from a work gear.

Figure 12:
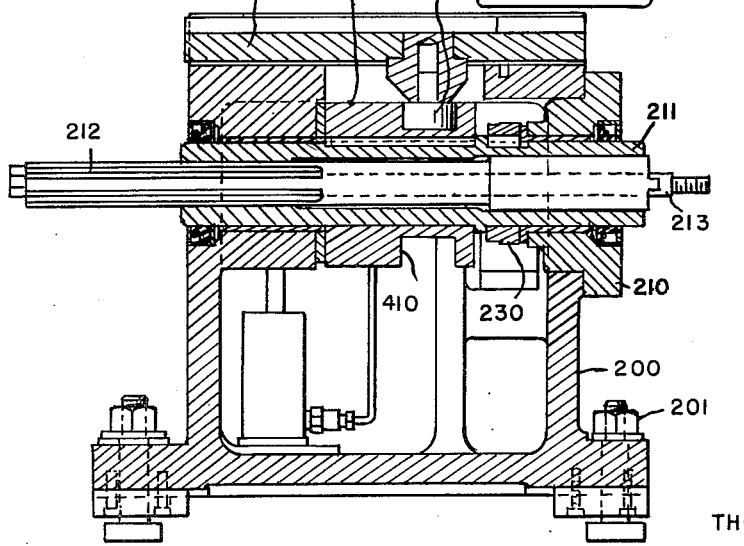
Figure 12 is a section on the line 12—12 of Figure 11.

As previously stated, similar gib clamping and releasing means are provided in both the right and left hand head, except that in the right hand head the operating cam 75 is carried by the shaft 72, while in the left hand head the equivalent cam 230 is carried by the shaft 211. These means are best seen in Figures 12 and 13. As seen in Figure 15, the movable gib 203 has an opening 227 through which passes a draw bar 228 having an adjusting nut 229 threaded to the end thereof and engaging the upper surface of the gib 203. It will be noted that the gib 203 is clamped and released only adjacent the inner end thereof, that is, the end which is adjacent to the work piece. The means for clamping and releasing the gib comprises a gib clamping cam 230 which is keyed or otherwise secured to the hollow shaft 211 and which is adapted to be engaged by a roller 231 carried by a clamping lever 232 which is pivoted to the frame 200 as by a pivot pin 233. The lever 232, as best seen in Figure 15, is slotted so as to surround the draw bar 228. The draw bar 228 has an enlarged plug 235 integral therewith, against the upper surface of which the rounded lower ends of the lever arms 236 engage. The cam 250 has a high portion 237 which engages the roller 231 just prior to termination of rotation of the cam 230. As the roller 231 rides up on the high portion of the cam the lever 232 rotates about the axis of the pin 233 and the lower portion of the two lever arms 236, which engage the upper flat surface of the plug 235, are forced downwardly, thus drawing the draw bar 228 downwardly so as to clamp the forward end of the gib 203.

Outwardly from the draw bar 228, the gib 203 is supported on the casting 200 by a plurality of clamping bolts 240 which are drawn up so as to provide a sliding fit between the plate 204 and the gibs 202 and 203. The cam 230 is so designed, however, that a very firm clamping action results when the draw bar 228 is moved downwardly and all play or clearance is taken out at the forward end of the clamping gib 203. This provides a very firm support for the headstock and tailstock.

*Automatic loading fixture*

The automatic loading fixture 300 comprises an assembly adapted to be supported on the machine between the right and left heads. The construction of the automatic loading fixture is illustrated in detail in Figures 16 through 21.

The fixture comprises a back plate 300a, a front or cover plate 301, and a loading rail 302 which is inclined as best seen in Figure 17 so as to permit gravity feed of a plurality of work pieces indicated at W. The entire automatic loading fixture is carried at the front of the machine by a forwardly extending support 303 which is secured to the table 18. To afford additional rigidity to the support, the loading fixture is provided with a clamp 304 adapted to engage the tie rod 136 and an opening 305 is provided to receive the other tie rod 135.

A rotatable loading drum 310 is provided which is keyed or otherwise secured as indicated at 311 to the index sleeve 312 carried by the shaft 57, as best seen in Figure 6.

It will be recalled that the index actuating mechanism was constructed and arranged to provide for 60 degrees incremental uni-directional rotation of the index cam 83 which is imparted to the drum 310 through the medium of the keyed connection 311 just referred to.

Spaced at 60-degree intervals around the periphery of the loading drum 310 are slots or recesses 320, each of which is adapted to receive one of the work pieces W at a loading position, move it to a working position, and thereafter carry it around to a discharge chute later to be described.

Pivoted to the frame of the automatic loading fixtures, as indicated at 325, is a lever 326, one end of which is in position to be engaged by the work gear W which is in loading position. The opposite end of the lever 326 carries an adjustable actuating screw 327 which cooperates with a micro-switch MS5 whose function is to prevent further automatic cycling of the machine in the event that no work gear is in position to engage the free end of the lever 326.

A light compression spring 328 is provided biasing the lever 326 in a clockwise direction, as seen in Figure 17, the strength of the spring being just sufficient to support the weight of the lever so that the presence of a single work gear in loading position will cause the lever to rock about its pivot support 325 and actuate micro-switch MS5.

Pivoted to the frame of the automatic loading fixture, as indicated at 330, is a second lever 331 having at one end an adjustable actuating screw 332 adapted to engage a micro-switch MS4. The other end of the lever has a camming portion 335 against which a work gear W rides as it moves from loading position to working position. The camming portion 335 of the lever is shaped to present the work piece with its opening in alignment with the work engaging means carried by the right and left hand heads. However, inasmuch as a work gear W is required to come into mesh with the teeth of a gear-like cutter as it moves from loading to working position, it may occur that the teeth of the work gear W and the gear-like cutter may not engage. In this case instead of riding up on the camming portion 335 of the lever, the gear is forced downwardly in its slot 320, with the result that the lever 331 pivots abouts its support 330 and actuates micro-switch MS4. Micro-switch MS4 is connected to the circuit controlling the cutter motor and when actuated results in jogging the motor so as to cause very slight intermittent rotational movement of the cutter. If it has happened that the teeth of the work gear W and cutter have failed to mesh properly, the first jogging of the cutter motor will ordinarily result in bringing the parts into alignment, at which time compression spring 340 will cause the lever 331 to rotate, thereby lifting the work piece W into firm mesh with the gear-like cutter. This rocking movement of the lever 331 moves the actuating screw 332 away from the micro-switch MS4 and interrupts the jogging of the motor, at the same time preparing the circuit for further automatic cycling.

In lieu of jogging the cutter as described above, in the event that the gear and cutter fail to mesh on initial contact, it may be preferred to provide for a slow rotation of the cutter prior to engagement therewith of the work gear, as previously described.

After a gear has been finished at the loading position (which is the uppermost position of the notches 320 as illustrated in Figure 17) the gears are indexed 60 degrees at a time until they reach the lowermost position on the index drum. At this time they pass under a stripper plate 345. Continued index rotation of the drum causes the work gears W to be moved out of their recesses 320 and they advance along a finished work receiving chute 346. At the outer end of this chute is a lever 347 pivoted as indicated at 348 to the loading fixture. The lever 347, as indicated in Figure 16, normally engages micro-switch MS3. When however, the finished gear chute 346 is filled the outermost gear contacts the lever 347 and moves it away from micro-switch MS3 which is connected to the circuits so as to prevent further automatic cycling of the machine until the operator has removed the finished gears from the chute 346.

In Figure 19 there is illustrated the manner in which a work piece W is engaged between a right male stub arbor 350 and a left female stub arbor 351. The end of the left female arbor is recessed as indicated at 352 to receive the tapered end 353 of a pilot projection carried by the right male arbor 350. In operation, as the arbors advance the tapered pilot 353 passes through the hole of the gear and enters the recess 352 formed at the end of the arbor 351. This assures proper alignment of the arbors. As the arbors engage opposite sides of the work piece W, a predetermined spring pressure is applied thereto by virtue of the lever 102 previously described. Arbors 350 and 351 are mounted in their supports for free rotation, the cutter in head 13 being positively driven by a separate motor.

*Index cam, index actuator cam, and head and tailstock advance cams*

Reference was previously made to the overall operation of the various cams in the apparatus and attention is now directed specifically to Figures 23 through 37 for a detailed explanation of these cams.

Figures 31, 32:
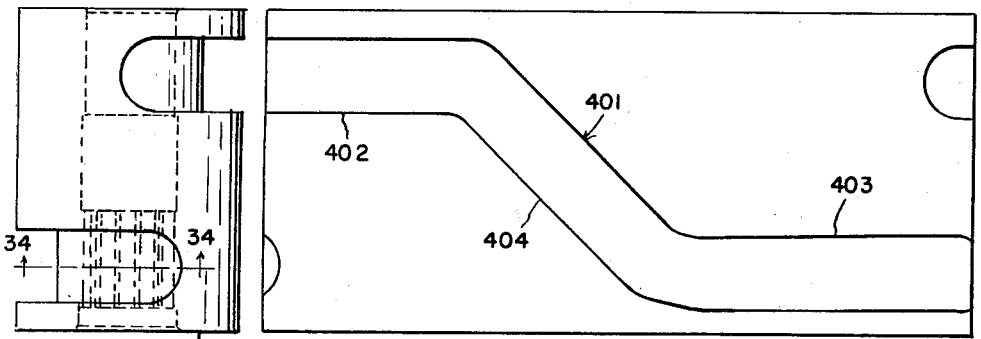
Figure 31 is a side elevation of the headstock advance cam for the right hand head.
Figure 32 is a developed view of the cam shown in Figure 31.
Figures 33, 34:
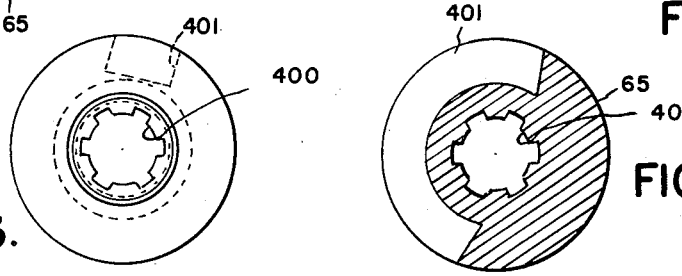
Figure 33 is an end view of the cam shown in Figure 31.
Figure 34 is a section on the line 34—34 of Figure 31.

The headstock advance cam 65 is illustrated in Figures 31–34. This cam is in the form of a cylinder having an internally splined opening 400 by means of which it is slidably secured to a correspondingly splined section of the shaft 57. The purpose of the provision for relative sliding movement between the cam 65 and the shaft 57, as previously described, is to permit establishing a predetermined pressure on the work piece by the working engaging element carried by the plate 67 on the right hand head. In Figure 32, which is a developed view of the cam, it will be noted that the cam is provided with a slot 401 having straight portions 402 and 403 interconnected by an inclined or helically extending portion 404. As the cam 65 is rotated first in one direction and then in the other a corresponding back-and-forth motion is imparted to the headstock plate 67 as the roller 65a engages the inclined portion 404 of the cam slot.

Referring now to Figures 28–30, there is illustrated at 215 the tailstock advance cam, which is substantially similar to the headstock advance cam except that the inclination of the cam slot is reversed and of a different extent. As best seen in Figure 29, which is a developed view of the cam, the cam slot 410 has straight portions 411 and 412 interconnected by an inclined or helically extending portion 413. It will be observed that the inclined portion 413 is of substantially smaller extent than the inclined portion 404 of the cam slot formed in the headstock advance cam 65. This is for the reason that the headstock advance cam, as illustrated in Figure 19, requires sufficient movement to cause the reduced tapered pilot portion 353 to pass completely through the opening in the work gear W, whereas the left arbor 351 requires only sufficient movement to engage and disengage the side of the gear.

The tailstock advance cam 215 is provided with a central opening 415 having a keyway 416 formed therein by means of which it is rigidly secured to the shaft 212. As best seen in Figure 12, the cam slot 410 receives the roller 216 depending from the tailstock support plate 204 and accordingly rotation of the cam 215 in one direction or the other will effect forward or rearward movement of the tailstock support plate 204.

Figure 10:
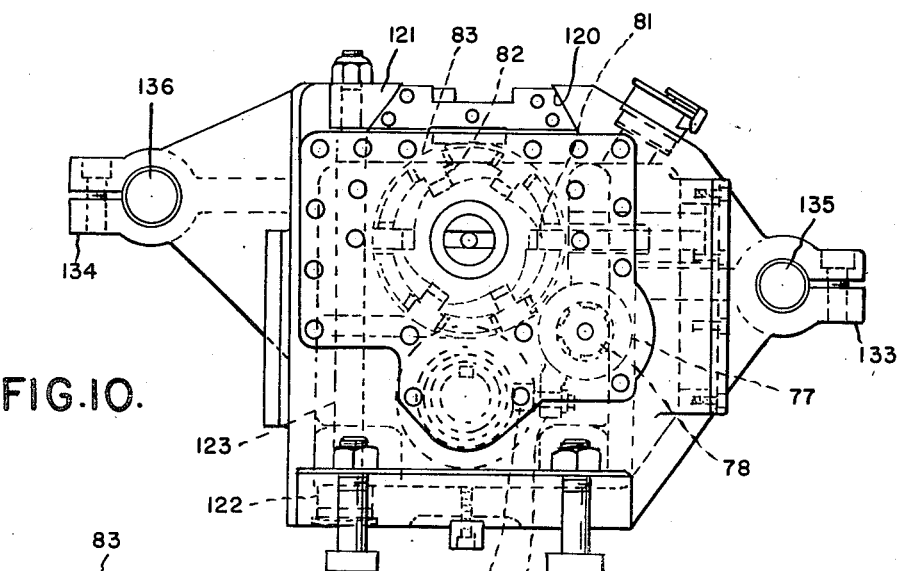
Figure 10 is a side elevation looking from the left of the right hand head shown in Figure 5.
Figure 10A:
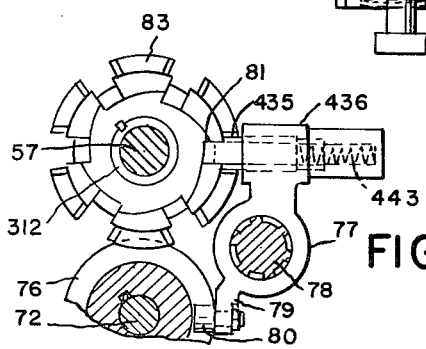
Figure 10A is a detailed sub-assembly showing the index actuator cam, the index slide and the index cam.
Figure 11:
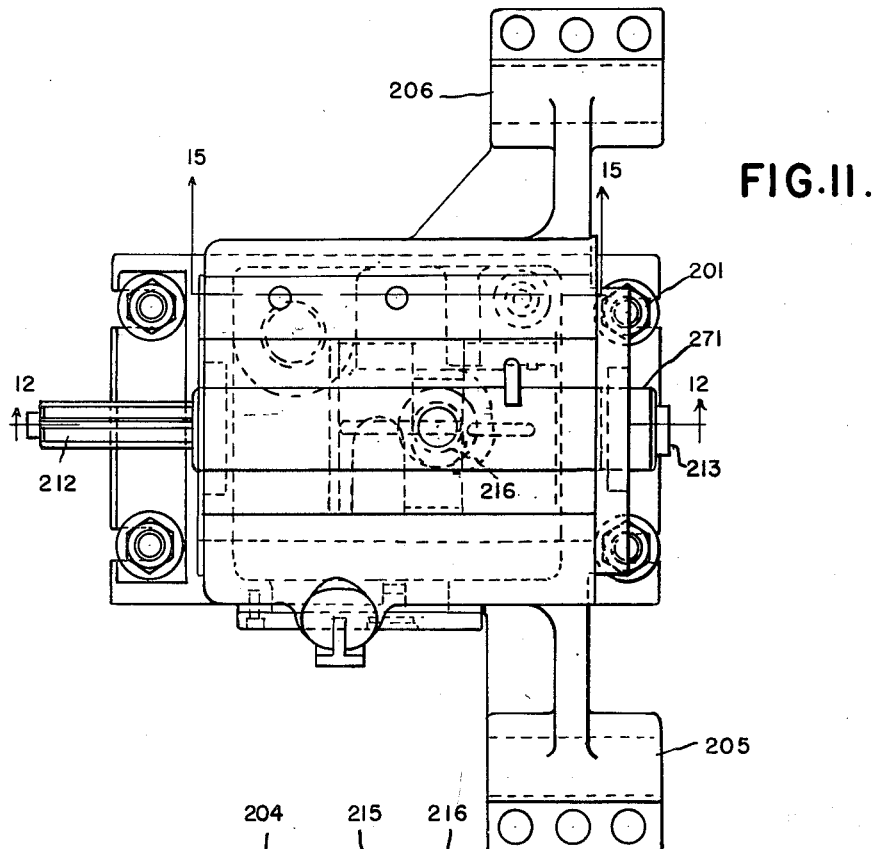
Figure 11 is a plan view of the left hand head of the automatic loading attachment.
Figures 35, 36:
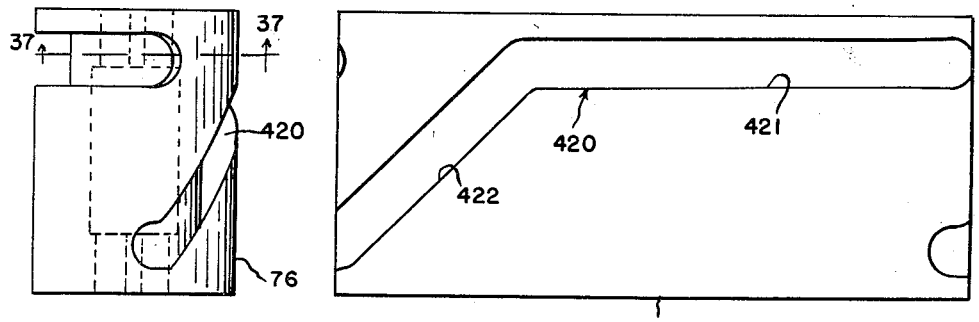
Figure 35 is a side elevation of the index actuator cam for the right hand head.
Figure 36 is a developed view of the cam shown in Figure 35.
Figure 37:
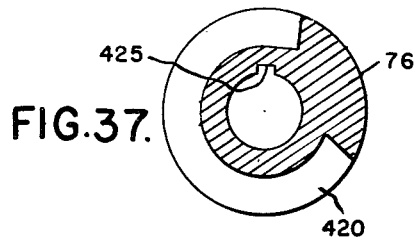
Figure 37 is a section on the line 37—37 of Figure 35.

The mechanism for effecting index movement of the drum 310 comprises the index cam 83 illustrated in Figures 23 through 27, the index actuator cam 76 shown in Figures 35–37, and an intermediate index slide 77 slidably supported on the spline shaft 78, as best seen in Figure 10A.

It will be recalled that the motor 52 is driven alternately in opposite directions to effect automatic loading of work pieces, movement of work pieces from loading to index position, and clamping and unclamping of a work piece at working position. At the same time, it is necessary to effect intermittent, incremental, uni-directional rotation of the index drum 310. Rotation of the shaft 57 is transmitted through the gears 70, 71 to the shaft 72 and to the index actuator cam 76 carried thereby. The index actuator cam 76, as best illustrated in Figure 10A, serves to transform its reverse rotational movement to reverse translatory movement of the index slide 77, which has a spline connection to the shaft 78 for this purpose.

Referring now to Figures 35–37, it will be observed that the index actuator cam 76 is in the form of a drum or cylinder having a cam slot 420. In the developed view of Figure 37 the cam slot 420 is shown as having a straight circumferential portion 421 and an inclined or helically extending portion 422. The index slide 77 includes the radially extending arm 79 carrying the roller 80 which extends into the cam slot 420. As the roller encounters the inclined or helically extended portion 422 of the cam slot 420, translatory motion is imparted to the index slide 77 in a direction parallel to the axis of the spline shaft 78. The index actuator cam 76 is timed with respect to rotation of the shaft 72 so that releasing motion of the headstock and tailstock takes place during the first part of rotational movement of the shaft 72 in one direction, and clamping movement of the head and tailstock takes place during the last portion of rotational movement of the shaft 72 in the opposite direction. The cam 76 is provided with a recess 425 for establishing a keyed connection to the shaft 72.

The index cam 83 illustrated in Figures 23 to 27 is in the form of a cylinder having an internal opening 430 by means of which it is keyed to the sleeve 312, as best seen in Figures 6 and 10A. The outer surface of the cam 83 is provided at one end thereof with a radially extending peripheral flange 432 which is notched as indicated at 433, the inner end of the notches being chamfered as indicated at 434 to provide guiding surfaces to guide an index key 435 into the notches. The index key 435 is in the form of a block carried by an arm 436 extending from the index slide 77. In addition to the index flange and notches the cam 83 is provided with a system of actuating grooves best seen in the developed view of Figure 25. These grooves comprise straight, axially extending portions 440 and inclined or helically extending portions 441. Arm 436 of the index slide 77 supports the slidably mounted actuator pin 81 which is biased toward the index cam 83 by means of a compression spring indicated at 443 in Figure 10A.

Referring now to Figures 25, 26 and 27, the cam slots 440 and 441 are constructed and arranged to impart intermittent, incremental, uni-directional rotation to the index cam. For this purpose the bottom of the slots 440 and 441 are arranged at different levels or in steps so as to effect the type of rotation referred to. Thus, in Figure 26 it will be observed that the bottom 445 of the straight slot 440 includes an inclined portion 446 terminating in a drop-off 447. The drop-off is in line with the side of the inclined slot 441. Accordingly, as the pin 442 moves from the bottom of the slot 440 to the top, as seen in Figure 25, it rides over the inclined surface 446 and drops off to a second flat surface 448 which is at a lesser depth than the flat surface 445. The inclined slot 441, as best seen in Figure 27, has a bottom surface 450 which is at a uniform depth equal to the depth of the bottom 448 of the straight slot 440. Accordingly, the intersection of the bottom 450 of the inclined slot 441 provides a shoulder or drop-off 451 where it intersects with the straight slot 440.

In order to understand the operation of the index cam by the index slide, assume the pin 81 to be in the dotted line position shown in Figure 25. As the pin 81 moves upwardly it rides up over the inclined surface 446 and drops off the shoulder or drop-off 447 and continues with its end surface engaging the flat surface 448 until it reaches the upper end of the straight slot 440. As it reaches the upper end of the slot the index block 435 enters into the index slot 433, being guided thereinto by the chamfered guiding surface 434. This firmly locks the index cam in indexed position. The next cycle of the machine results in traverse of the index slide 77 downwardly, as seen in Figure 25, relative to the index cam, with the result that the pin 81 rides down the straight slot 440, the bottom of the pin at this time engaging the bottom surface 448 of the groove. The index block 435 is withdrawn from the index groove or notch 433, thus permitting rotation of the index cam. The pin 81 engages the drop-off or shoulder 447 at the intersection of the straight slot 440 and the inclined slot 441 and is thereby constrained to follow the inclined slot 441. This results in an index rotation of the cam, in the present instance the amount of rotation being 60 degrees. As the 60-degree increment of rotation is completed the pin 81 drops off the bottom surface 450 of the inclined groove 441 at the shoulder or drop-off 451 into the next adjacent straight slot 440 and engages the flat bottom 445 thereof. The next reverse rotation of the index actuator cam 76 causes the pin 81 to again move upwardly along the straight slot as previously described, thus locking the index cam in its indexed position.

It will be observed that by the construction just described incremental, intermittent, alternately reverse rotation of the index actuator cam 76 results in incremental, intermittent, alternately reverse translation of the index slide 77 and this in turn results in intermittent, incremental, uni-directional rotation of the index cam 83.

Operation

The foregoing detailed description of the construction of the improved apparatus is believed to afford a basis for a full understanding of the operation but this may be advantageously reviewed. The automatic cycling of the machine is controlled by a plurality of switches whose functions have previously been referred to. Inasmuch as the interconnection of these switches into a complete circuit calls for no more than the skill of the ordinary electrician, it has been thought undesirable to complicate the present disclosure with a complete illustration and description of the wiring diagram.

The machine is designed for high quantity production of uniform parts, as for example a series of gears. In the initial setup the adjustable tool supporting head 13 is set at the proper angle to provide for a crossed axes meshed relationship between a gear-like cutter carried thereby and a work gear carried between the arbors 350 and 351. The machine which has been selected to illustrate the present invention is designed for carrying out a shaving operation known as diagonal traverse. This shaving operation requires a single back-and-forth relative traverse between the work gear and the cutter without the necessity of providing infeed during the shaving cycle. It will be appreciated however, that if desired infeed could be included in the cycle by the simple expedient of feeding the table 18 vertically at the proper point in the cycle. After the initial setup of the machine, which includes the angular setting of the tool support 13 and the vertical setting of the table 18 to finish the work gears W to the desired dimension and the angular setting of the ways 17 so as to provide relative traverse between the gears W and the gear-like cutter in a desired direction, the machine is ready for fully automatic production.

The operator supplies gears to the loading rail or chute 202, with the result that the gears are fed by gravity and presented to the index drum for indexing. At this time the foremost of the gears W will engage the free end of the lever 326 and will thereby actuate switch MS5 so as to permit further automatic cycling of the machine. At this time of course switch MS3 is actuated by lever 347. Upon starting the machine for automatic cycling, arbors 350 and 351 have been advanced to working position, and the clamping gibs 121 and 203 are clamped to retain the slides 67 and 204 in locked position. Upon energization of the motor 52 the clamping gibs are released, the head and tailstock are retracted and the index drum 310 is rotated 60 degrees, thereby moving the work gear W to the operating position. As the work gear W moves from loading to working position it rides up the inclined portion 335 of the lever 331. The spring 340 engaging this lever is sufficient to sustain the weight of the gear and the gear will move into mesh with the gear-like cutter provided the teeth thereof are in proper position for meshing. If, however, the teeth of the gear and cutter do not come into mesh the gear is displaced downwardly in its notch 320, thereby rocking the lever 335 about its pivot 330 and actuating switch MS4. Actuation of the switch MS4 results in intermittent jogging of the motor which rotates the cutter and will result in bringing the gear and cutter into mesh.

Instead of the intermittent jogging of the motor as above described, it may be preferable to provide for a slow rotation of the cutter which is initiated before the gear contacts the cutter, so that in the event the teeth of the gear and cutter fail to mesh on initial contact the slow continuous rotation of the cutter will bring about immediate meshing of the parts.

As the teeth of the gear and cutter come into mesh, the lever 331 raises the gear into fully meshed position and withdraws the actuating screw 332 from the switch MS4, thereby permitting further automatic cycling. This automatic cycling calls for reverse rotation of the motor 52 which during the cycle as thus far described has driven shafts 57 and 72 through substantially a complete revolution and has been stopped by engagement between the arm 90 and the finger 93 (Figure 8). At the same time, one of the switches MS7 or MS8 has been actuated by its appropriate cam to interrupt rotation of the motor. Reverse rotation of the motor takes place until the shafts 57 and 72 have completed substantially 360 degrees of rotation in the opposite direction, at which time rotation of the shafts is interrupted by actuation of the other one of the switches MS7 or MS8. This reverse rotation of the motor results in advance of the headstocks carrying the arbors 350 and 351. The pilot portion 353 of the arbor 350 passes through the opening in the gear W and enters into a guided recess at the free end of the arbor 351. Advance of the arbor 350 continues until the arbor engages the side of the gear W. At this time the inner end of the headstock advance cam is bearing against the abutment 100 and the parts are so arranged that a slight additional rotation is imparted to the cam. Inasmuch as no further advance of the slide 61 is permitted this slight additional rotation of the cam 65 causes the cam to back up or move to the right as seen in Figure 6, thus causing the cam 65 to apply a clamping force to the slide 67 which is determined by the compression of the spring 106 which engages the clamping lever 101. Movement of the clamping lever 101 moves the cam plate 112 (Figure 7A) and as the exactly predetermined or desired movement is imparted thereto the roller 114 of switch MS6 drops into the cam notch 113. This permits further cycling of the machine. If however, due to the absence of a gear at the work station or the presence of an oversize or undersize gear thereat, the roller 114 fails to register exactly with the notch 113, further automatic cycling of the machine is terminated until the difficulty is corrected. During the rotation of the motor last referred to and after the plates 67 and 204 have been advanced to their operating position, the gib clamping cams 75 and 230 through their cooperating levers and draw bars cause downward clamping movement of the clamping gibs, with the result that the head and tailstock are positively locked in working position.

Completion of this portion of the index cycle prepares the machine for its automatic working cycle which involves a back-and-forth translation of the table 18, the switches 39 and 40 serving to reverse translation at the end of each stroke and also to reverse rotation of the motor which drives the cutting tool in rotation. Upon completion of the reverse translation, table traverse and rotation of the cutter is stopped. Providing that another gear is available in the loading chute and that the finished gear receiving chute 346 is not filled, the above described cycle is repeated.

It will therefore be apparent that after the initial setup of the machine it is necessary for the operator only to supply work gears to the loading rail 302 and to remove finished gears from the chute 346 in order to keep the machine automatically cycling. Furthermore, the automatic operation of the machine has been designed to provide a minimum time cycle. In order to accomplish this the several necessary motions of loading and unloading, indexing, clamping and unclamping occur simultaneously. Thus, at the instant the shaving cycle is completed the indexing cycle commences and the time interval between shaving cycles is substantially that required to move a new gear through the 60-degree arc from loading to working position.

The apparatus has further been designed to avoid the possibility of damage to the machine. The only duty of the operator is to supply unfinished gears to the machine and remove finished gears from the machine. About the only thing which an operator could do which is improper is to position a gear in the loading chute which will not mesh properly with the cutter or which is oversize or undersize either in width or diameter. If the gear is not within predetermined limits of width, automatic cycling is terminated by failure of the roller 114 to engage in the notch 113 of the cam lever 112. If the gear is oversize in diameter the lever 331 is not permitted to rotate clockwise to the predetermined position and therefore switch MS4 will prevent further automatic cycling of the machine. Attention is directed to the fact that the switch MS4 is a micro-switch capable of very fine adjustment and its actuator includes the adjusting screw 332. It is possible to adjust the screw 332 so that if a gear is oversize in diameter by an amount sufficient to result in injury to the cutter or machine, the machine will automatically stop until the gear is removed.

The drawings and the foregoing specification constitute a description of the improved automatic loading equipment for machine tools in such full, clear, concise and exact terms as to enable any person skilled in the art to practice the invention, the scope of which is indicated by the appended claims.

What I claim as my invention is:

1. Automatic loading apparatus for a machine tool comprising a rotary drum having peripheral work receiving recesses movable upon intermittent rotation of the drum from a loading station to a working station, and cam means shaped to engage work pieces in said recesses as they advance to working position and to move them outwardly in said recesses.

2. Automatic loading apparatus for a machine tool comprising a rotary drum having peripheral work receiving recesses movable upon intermittent rotation of the drum from a loading station to a working station, and cam means shaped to engage work pieces in said recesses as they advance to working position and to move them outwardly in said recesses, said cam means being movably mounted to provide for inward movement of said work pieces at said working station if interference prevents the work piece moving freely to working position.

3. Automatic loading apparatus for a machine tool comprising a rotary drum having peripheral work receiving recesses movable upon intermittent rotation of the drum from a loading station to a working station, cam means shaped to engage work pieces in said recesses as they advance to working position and to move them outwardly in said recesses, said cam means being movably mounted to provide for inward movement of said work pieces at said working station if interference prevents the work piece moving freely to working position, work gripping means engageable with the work pieces at the working station, and means operable by movement of said cam means to prevent gripping movement of said gripping means until a work piece is in proper working position.

4. In a gear finishing machine, a carrier for advancing a work gear into meshed engagement with a gear-like tool, means supporting said gear in said carrier for movement therein toward and away from the tool, resilient means maintaining a light pressure tending to move the gear relative to said carrier in a direction to mesh with the tool, said resilient means being yieldable upon movement of said gear in said carrier in a direction away from the said tool upon failure of the gear and tool to mesh on initial contact, and means responsive to said last mentioned movement of the gear in said carrier to rotate the tool.

5. In a gear finishing machine, a support for a gear-like cutter, a carrier for advancing a work gear into mesh with the cutter, said carrier having a slot therein receiving the gear, a pivoted lever having a camming portion shaped to engage the gear as it approaches the cutter to move the gear outwardly in the slot, yieldable means holding said lever in position and permitting movement of said lever if the gear is forced inwardly of the slot by failure to mesh with the cutter, and means responsive to such movement of the lever to rotate said cutter support a small amount.

6. In a gear finishing machine, a support for a gear-like cutter, a rotatable carrier for advancing a work gear into mesh with the cutter, said carrier having a generally radial, peripheral slot therein receiving the gear, a pivoted lever having a camming portion shaped to engage the gear as it approaches the cutter to move the gear outwardly in the slot, yieldable means holding said lever in position and permitting movement of said lever if the gear is forced inwardly of its slot by failure to mesh with the cutter, and means responsive to such movement of the lever to rotate said cutter support a small amount.

7. In a machine, tool means for positioning a work piece in working position, a pair of work engaging elements movable toward and away from each other, cams for moving said elements toward and away from each other, an operating shaft for said cams, one of said cams having a slidable connection with said shaft, and spring means urging said cam along said shaft in a direction to cause approach of said elements but permitting rearward sliding movement to predetermine the pressure applied to the work.

8. In a machine, tool means for positioning a rotary work piece in working position, a pair of slides movable toward and away from each other and each carrying a rotary work engaging element, a power shaft parallel to the direction of movement of said slides, cams on said shaft, cam followers on said slides, one of said cams being slidable on said shaft, means comprising a spring biased lever engaging said cam and urging said cam in work engaging direction to determine the pressure applied to the work, and means responsive to position of the lever to prevent operation of the machine unless a work piece of proper size is engaged by said elements.

9. A machine tool comprising a headstock and a tailstock movable toward and away from each other along ways provided with clamping gibs, a loading fixture including a rotatable index drum for advancing work pieces from a loading position to a working position, a single reversible motor for effecting advance and recession of said stocks, clamping and unclamping of said gibs and index rotation of said drum, cams driven by said motor comprising head and tailstock advance cams reversibly rotated to effect advance and recession of said stocks, gib clamping cams reversibly rotated by said motor to effect clamping and release of said gibs, an index actuator cam reversibly rotated by said motor, an index slide reversibly translated by said index actuator cam, and an index cam keyed to said drum and rotated in one direction in index steps by said index slide.

10. In a machine tool, automatic work loading, clamping and releasing means comprising a headstock, a tailstock and an automatic loading fixture, a single motor for actuating all of said means comprising a first and second shaft, a driving connection between said shafts, a headstock advance cam and a tailstock advance cam keyed to said first shaft and effective to advance or retract said stocks upon rotation of said shaft in opposite directions, clamping cams on one of said shafts effective to clamp said stocks after they have been advanced to working position, an index actuator cam on said second shaft rotatable thereby in opposite directions, an index slide reciprocable by said index actuator cam in opposite directions, and an index cam rotatably mounted on said first shaft and rotated a predetermined amount in one direction by each back-and-forth reciprocation of said slide.

11. In an automatic loading fixture, a reversibly actuated motor for effecting advance or recession of a pair of work engaging elements, a rotatable index drum for advancing work pieces from loading to working position, an index cam keyed to said drum, said cam having index notches therein, an index slide reciprocable in opposite directions by said reversible motor, inclined and straight connecting actuating grooves in said cam, a follower on said slide extending into said grooves effective to impart a single index rotation to said cam upon each back-and-forth reciprocation of said slide, and an index block carried by said slide adapted to enter one of said notches to secure said cam in accurately indexed position.

12. In an automatic loading fixture, a reversibly actuated motor for effecting advance or recession of a pair of work engaging elements, a rotatable index drum for advancing work pieces from loading to working position, a generally cylindrical index cam keyed to said drum, said cam having a radially extending flange at one end provided with index notches therein, an index slide reciprocable in opposite directions by said reversible motor, inclined and straight connecting actuating grooves in said cam, a follower on said slide extending into said grooves effective to impart a single index rotation to said cam upon each back-and-forth reciprocation of said slide, and an index block carried by said slide adapted to enter one of said notches to secure said cam in accurately indexed position.

13. In an automatic loading fixture, a reversibly actuated motor for effecting advance or recession of a pair of work engaging elements, a rotatable index drum for advancing work pieces from loading to working position, camming means for effecting index rotation of said drum and advance and recession of said elements in timed relation, means for effecting exactly predetermined rotation of said cams in opposite directions comprising a friction drive between said motor and said cams, a mechanical stop for said cams, and reversing switches automatically operated just prior to completion of the desired rotation of said cams to de-energize said motor, said mechanical stops effective to stop coasting of said motor when said cams have completed the predetermined rotation.

14. An automatic loading fixture for a gear finishing machine of the type having a gear-like tool, means for supporting and driving said tool in rotation, and work-holding means for gripping a work gear in meshed relation with said tool and supporting said gear for free rotation, said fixture comprising means for advancing work gears in succession into contact with said tool, means for retaining said gears in such positions with provision for continued approach between said gear and tool if the gear and tool fail to mesh on initial contact, means for thereafter initiating rotation of said tool to cause said gear and tool to mesh, and means effective thereafter for actuating said work-holding means.

15. Apparatus for moving a gear into meshed relation with a gear-like finishing tool which comprises a carrier, means for moving said carrier toward the tool along a path generally perpendicular to the axis of the gear to mesh a gear carried by said carrier with the tool, gear supporting means associated with said carrier supporting said gear in position such that the gear is advanced along a path which causes a toothed peripheral portion of the gear to approach the tool tangentially, said gear supporting means including yieldable means normally constraining the gear to follow the aforesaid path but being yieldable to provide for movement of the gear out of said path if the teeth of the gear and tool fail to mesh on initial contact, and means operated by movement of the gear out of its path of advance effective to initiate relative rotation between said gear and tool to bring their teeth into mesh.

16. Automatic loading equipment for a gear finishing machine comprising rotary work engaging members, means for relatively moving said members toward and away from each other to engage and release a work gear, a rotary carrier having circumferentially spaced work supporting means thereon, a single reversible drive motor for actuating said loading equipment, a drive shaft coupled to said motor, friction drive means between said motor and shaft, stop means associated with said drive shaft to limit rotation thereof to substantially 360 degrees, cam means on said drive shaft for relatively moving said work engaging members toward each other upon rotation of said shaft in one direction and for relatively moving said work engaging members away from each other on reverse rotation of said shaft, a countershaft geared to said drive shaft, a cam on said countershaft, a slide mounted for movement parallel to the axis of said counter shaft, a cam follower on said slide to effect sliding movement of said slide upon rotation of said cam, an index cam secured to said rotary carrier, and means on said slide and index cam effective to cause a predetermined rotation of said index cam upon movement of said slide in one direction, and to retain said index cam without rotation upon movement of said slide in the opposite direction.

17. A gear finishing machine comprising a pair of stocks for supporting a work gear for rotation, ways on which one of said stocks is slidable including a movable clamping gib, a rotary carrier having gear supporting means spaced around its periphery, a reversible motor, a drive shaft, a friction coupling between said motor and drive shaft, means limiting rotation of said drive shaft, cam means driven by said drive shaft effective to first release said clamping gib and then to retract said one stock and to advance said carrier on rotation of said drive shaft in one direction, and to first advance said stocks and then to clamp said gib upon rotation of said drive shaft in the other direction.

18. A gear finishing machine comprising a frame, a gear-like cutter on said frame, means for driving said cutter in rotation, a table reciprocable on said frame, rotary work support means on said table adapted to support a work gear member in mesh with said cutter, means for traversing said table in a plane parallel to the axes of said cutter and said work support means, automatic loading equipment for said work support means mounted on said table for traverse therewith, said equipment comprising a carrier adapted to engage peripheral portions of and to support a work gear member thereon for displacement therefrom, means for advancing said carrier to move the work gear member carried thereby toward said cutter with peripheral portions of said cutter and gear member approaching generally tangentially, said carrier being yieldable to accommodate movement of the gear out of its path of advance if the gear member and cutter fail to mesh, means for actuating said work support means to engage the gear member after it has meshed with said cutter and to displace it from said carrier for free rotation, and means for actuating said work support means after a machining operation to release the gear member.

19. A machine as defined in claim 18 in which said work support means comprises at least one center, and means for advancing said center into engagement with the work gear member.

20. A gear finishing machine comprising a frame, a gear-like cutter on said frame, means for driving said cutter in rotation, a table reciprocable on said frame, rotary work support means on said table adapted to support a work gear in mesh with said cutter, means for traversing said table in a plane parallel to the axes of said cutter and said work support means, automatic loading equipment for said work support means mounted on said table for traverse therewith, said equipment comprising a carrier adapted to support a work gear thereon, means for advancing said carrier to move a work gear carried thereby toward said cutter with peripheral portions of said cutter and gear approaching generally tangentially, said carrier comprising means providing for yielding movement of the gear out of its path of advance upon failure to mesh with said cutter means for actuating said work support means to engage a work gear after it has meshed with said cutter, means for separating said carrier and work gear to provide for free rotation of the work gear in meshed relation with said cutter.

21. An automatic loading fixture for a gear finishing machine of the type comprising a frame having a gear-like cutter mounted thereon, motor drive means for rotating said cutter, a work table reciprocable on said frame, work holding means for gripping a work gear in meshed relation with said cutter and supporting it for free rotation, said fixture comprising a carrier on said table for successively advancing work gears toward said cutter in tangential relation, means supporting the gears on said carrier with provision for yielding movement away from said cutter if a gear and cutter fail to mesh on initial contact, and means for effecting slow rotation of said cutter to insure meshing with a work gear.

22. A loading fixture as defined in claim 21 in which said last means comprises a switch operable by said fixture to effect brief energization of said motor means prior to fully meshed engagement between said cutter and a gear.

23. Apparatus of the character described comprising a rotary support for a gear-like tool, work support means for rotatably supporting a work gear in mesh with a gear-like tool on said tool support at predetermined center distance, said work support means comprising an element movable toward a work gear meshed with the tool to engage and support the gear for rotation in mesh with the tool and movable away from the gear to release the gear, a carriage, means on said carriage for supporting a work gear for rotation and for yielding movement relative thereto if the teeth of the gear and tool fail to mesh on initial contact, means for advancing said carriage along a path such that peripheral portions of the gear and tool approach generally tangentially, means for moving said element toward the work gear following meshing thereof with the tool, said element being effective to move the gear out of contact with the carriage for free rotation while said carriage remains in position, means for rotating said tool support, means for thereafter moving said element away from the gear to release the gear and return it to said carriage, and means for moving said carriage to move the gear away from the tool.

24. Apparatus of the character described comprising a rotary support for a gear-like tool, work support means for rotatably supporting a work gear in mesh with a gear-like tool on said tool support at predetermined center distance, said work support means comprising an element movable toward a work gear meshed with the tool to engage and support the gear for rotation in mesh with the tool and movable away from the gear to release the gear, a carriage, means on said carriage for supporting a work gear for rotation and for yielding movement relative thereto if the teeth of the gear and tool fail to mesh on initial contact, means for advancing said carriage along a path such that peripheral portions of the gear and tool approach generally tangentially, means for imparting a slow rotation to the tool as the gear comes into contact therewith, means for moving said element toward the work gear following meshing thereof with the tool, said element being effective to move the gear out of contact with the carriage for free rotation while said carriage remains in position, means for rotating said tool support, means for thereafter moving said element away from the gear to release the gear and return it to said carriage, and means for moving said carriage to move the gear away from the tool.

25. Apparatus of the character described comprising a rotary tool support for a gear-like tool, transfer means engageable with the periphery of a work gear for advancing it along a predetermined path into peripheral contact with a tool on said tool support with provision for rotation of the gear following meshing with the tool and for termination of advance of the gear along its predetermined path if the teeth of the gear and tool fail to mesh on initial contact, work support means comprising an element movable toward a gear in mesh with the tool and adapted to engage the gear and support it for rotation independently of said transfer means at predetermined center distance with respect to the tool, said element being reversely movable to release the gear, means effective to impart a slow rotation to said tool support as the work gear engages the tool, means for moving said element toward the work gear following meshing thereof with the tool to engage and support the gear for rotation in mesh with the tool, means for rotating the gear and tool in mesh, and means for thereafter reversely moving said element to release the gear.

References Cited in the file of this patent

UNITED STATES PATENTS

| Number | Name | Date |
|---|---|---|
| 1,017,881 | Landis | Feb. 20, 1912 |
| 1,516,146 | Buckingham | Nov. 18, 1924 |
| 2,352,726 | Maulding | July 4, 1944 |
| 2,576,497 | Austin | Nov. 27, 1951 |